United States Patent [19]
Phares et al.

[11] Patent Number: 5,672,412
[45] Date of Patent: Sep. 30, 1997

[54] RECYCLABLE CROSS-LAMINATED CORRUGATED AND FIBER CORE PALLET

[76] Inventors: Randy Lee Phares, 4017 W. Creedance Blvd., Glendale, Ariz. 85310-4066; David Paul Basto, 2025 W. Indian School Rd., Phoenix, Ariz. 85015

[21] Appl. No.: 308,295

[22] Filed: Sep. 19, 1994

[51] Int. Cl.⁶ .................... B32B 3/28; B65D 19/00
[52] U.S. Cl. .................... 428/182; 428/131; 428/137; 428/184; 428/188; 428/192; 108/51.3
[58] Field of Search ................ 428/182, 184, 428/172, 188, 192, 34.2, 131, 137; 108/51.1, 51.3

[56] References Cited

U.S. PATENT DOCUMENTS

| | | | |
|---|---|---|---|
| 479,999 | 8/1892 | Thompson | 428/184 |
| 1,654,137 | 12/1927 | McMillan | 428/185 |
| 2,091,918 | 8/1937 | Finck | 428/185 |
| 2,930,481 | 3/1960 | Bebie | 206/60 |
| 3,036,802 | 5/1962 | Kitchell | 248/120 |
| 3,256,839 | 6/1966 | Peterson | 108/56 |
| 3,464,370 | 9/1969 | Martin | 108/56 |
| 3,645,215 | 2/1972 | Kirkpatrick | 108/51 |
| 4,424,753 | 1/1984 | Eatherton | 428/184 |
| 4,792,325 | 12/1988 | Schmidtke | 493/334 |
| 5,067,418 | 11/1991 | Carter | 108/56.3 |
| 5,184,558 | 2/1993 | Wozniacki | 108/51.3 |
| 5,222,444 | 6/1993 | Youell, Jr. et al. | 108/51.3 |
| 5,433,156 | 7/1995 | Hutchison | 108/51.3 |

OTHER PUBLICATIONS

Paperboard Packaging, Feb. 1994, "Stone Container Reaches Production Milestone," pp. 14 and 16.

*Primary Examiner*—Donald Loney
*Attorney, Agent, or Firm*—Christie, Parker & Hale, LLP

[57] ABSTRACT

A totally recyclable pallet includes an upper and lower deck comprised each of corrugated paperboard horizontally and adhesively bonded together with the corrugated flutes of each sheet running perpendicular to the other. Each pallet is comprised of a predetermined number of dense fiber cores placed vertically in a strategic structural pattern and adhered to the said horizontally placed upper and lower decks, such that the cores separated the upper and lower decks by a distance that will allow the tines of a forklift or other pallet moving device to enter into any of its four sides. Each of the said decks may contain ergonomically placed cutouts to act as handholds for handling ease and safety.

15 Claims, 3 Drawing Sheets

RECYCLABLE CROSS-LAMINATED CORRUGATED AND FIBER CORE PALLET

BACKGROUND

| U.S. PAT. DOCUMENTS | | |
| --- | --- | --- |
| 2,930,481 | 3/1960 | Bebie |
| 3,036,802 | 5/1962 | Kitchell |
| 3,256,839 | 6/1966 | Peterson et al. |
| 5,067,418 | 11/1991 | Carter |
| 5,222,444 | 6/1993 | Youell, Jr. et al. |

The present invention generally relates to pallets used for handling, storing and shipping goods. These goods am placed upon the pallet to protect them from damage during transport and storage. More specifically the present invention relates to those pallets that are constructed using corrugated paperboard decks and having these decks separated and supported by paperboard blocks or runners in any form which may include cylindrical fiber cores and folded corrugated.

For years pallets have been constructed of wood for their strength, durability and reparability. These pallets when new can be expensive, and difficult to properly dispose of. They also require a large amount of virgin timber which takes many years to grow back and which could endanger certain species of animals. They are also very heavy resulting an thousands of ergonomic industrial injuries and many wounds due to splinters and nails.

The art, is turning to alternative pallet designs including metal, plastic, fiberglass, and paperboard. The paperboard pallets in particular have had many advantages over previous designs but they also have had their disadvantages. Some of these disadvantages include lower stability and support strengths due to the corrugation always running the same direction, many do not allow pallet moving equipment to enter from all four directions, and usually carry an unreasonably high price due to complicated support structures and the necessity to use expensive and complex machinery in order to construct the pallets.

Many of the current designs are unable to support heavy loads due to the nature of the existing designs available. Many of the existing designs also have added metal clips, U.S. Pat. No. 2,930,491 or other non-paper items making them unrecyclable and adding to the size of our landfills and depleting our forests. U.S. Pat. No. 5,222,444 utilizes a complex array of corrugated attachments making assembly complex and vertical strength weakened by handling loads causing possible damage to the products being supported. U.S. Pat. No. 5,067,418 saw the value in using fiber cores but the complex assembly requires added cost, making assembly more expensive, which will always shows up in the price of the pallet.

These other designs have failed to succeed in making a high quality, light weight, totally recyclable, inexpensive pallet with uniform deck strength, and superior vertical strength, that is easy to assemble using simple tools, and can be accessed by all four directions, while maintaining a safe pallet for manual handling.

SUMMARY OF THE INVENTION

The Recyclable Cross-Laminated Corrugated and Fiber Core Pallet hereafter called the Corrugated Pallet is comprised of an upper and lower deck, containing a predetermined number of strategically placed dense fiber cylinders placed intermittently and adhesively bonded between the two said decks. The two said decks are identical to each other and each contain the same materials. Each of the said decks is comprised of two corrugated sheets hereafter called the exterior and interior sheets. The interior and exterior sheets differ from each other in that the corrugation runs longitudinally on one sheet and latitudinally on the other, with the corrugated flutes being perpendicular to each other. This gives the deck more even strength in all directions, much the same as a plywood sheet, where a plywood sheet consists of multiple sheets of board adhesively bonded to each other with the grain of the wood running perpendicular to each other from sheet to sheet. The interior and exterior sheets of said Corrugated Pallet are adhesively bonded together in this arrangement by a specially formulated recyclable adhesive. Due to the arrangement of the said decks, they are said to be "cross-laminated" since the sheets are laminated with perpendicular corrugated flutes. Once the cross-laminated decks are manufactured a predetermined number of cylindrical dense fiber cores are interimposed between two of said cross-laminated decks and adhesively bonded thereto. Of each of the said cross-laminated decks either side may be considered the interior or exterior side depending on which side is adhesively bonded to the arrangement of fiber cores. The sheet so bonded shall be considered the interior sheet. The corners of each of the said decks will be rounded off to match the curvature of the cylindrical fiber cores. The resulting entity consisting of the two said cross-laminated decks adhesively bonded to a predetermined number of fiber cores interimposed between them will be considered the proposed Corrugated Pallet. These Corrugated Pallets may be of any size required by the market and contain any number of fiber cores in any arrangement. They may also have (optional) oval cutouts in each of the said decks to act as handholds for easy manual handling. They may also contain custom cutouts in any of the said decks if necessary to interface with any type of handling system, such as a Pallet Jack, if so required.

DETAILED DESCRIPTION OF DRAWINGS

Figure 1:
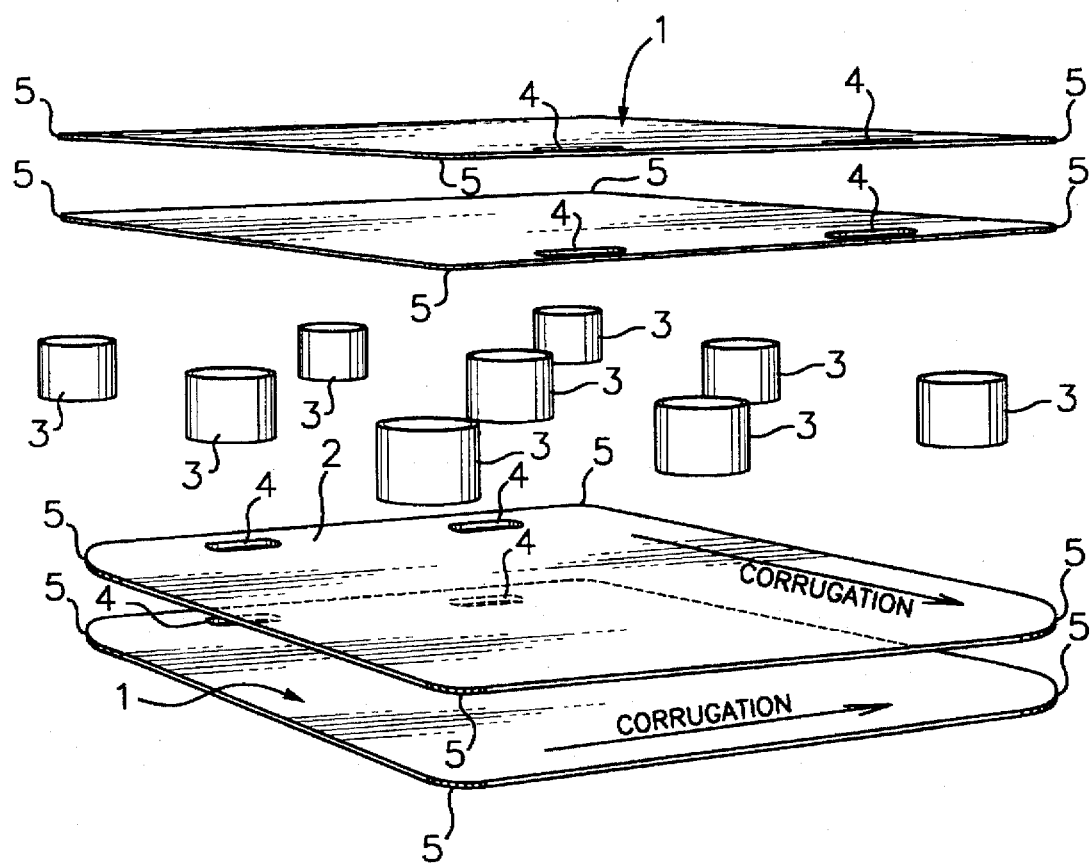
FIG. 1 is an exploded view of the proposed Corrugated Pallet displaying all of the individual components needed to assemble the pallet.

The construction of the Recyclable Cross-Laminated Corrugated and Fiber Core Pallet is shown as an exploded view to see all of the individual components in FIG. 1 on drawing sheet 1. The Corrugated Pallet is made up of two corrugated decks. The upper deck FIG. 2 number 1 and the lower deck FIG. 2 number 2 are shown in exploded view in FIG. 1. The upper and lower decks are identical to each other. When placed on a surface the lower of the two decks becomes the lower deck and the one above the vertical cores FIG. 1 number 3 becomes the upper deck. In the exploded view in FIG. 1 each corrugated deck is composed of two sheets of corrugated 1 and 2. Corrugated sheet 1 has the corrugated flutes running in the longitudinal direction, while sheet 2 has the corrugated flutes running in the latitudinal direction, making the flutes in the two sheets perpendicular to each other with both sheets placed in the horizontal direction. The two sheets are then laminated together with a specially formulated recyclable adhesive. The adhesion of the two said sheets 1 and 2 together, with the corrugated flutes running perpendicular to each other, will form the said deck and the sheets in this form will be considered "cross-laminated" to each other. Which ever side of each of the said decks faces inward upon construction will be considered the interior side of the deck and the corrugated sheet on the interior side will be the interior sheet 2. The side of the corrugated deck that faces outward will be considered the exterior side of the deck and the sheet on the exterior side will be considered the exterior sheet 1. The interior sheets of each of the said decks will have the interior side bonded by a specially formulated recyclable adhesive, to each respective end of the vertically placed dense cylindrical fiber cores 3, which will be interimposed in a predetermined number and pattern between the interior sheets of the upper and lower decks. Each of the upper and lower decks may have oval cutouts 4 called "handholds", placed in a predetermined location to allow a person to grab the pallets more easily. These handholds 4 will be cut through both the interior 2 and exterior 1 sheets to create a hole all the way through the deck. The corners 5 will be rounded off in the natural curvature of the cylindrical fiber cores 3 to make the perimeter of the pallet consistently attractive and strong.

Figure 2:
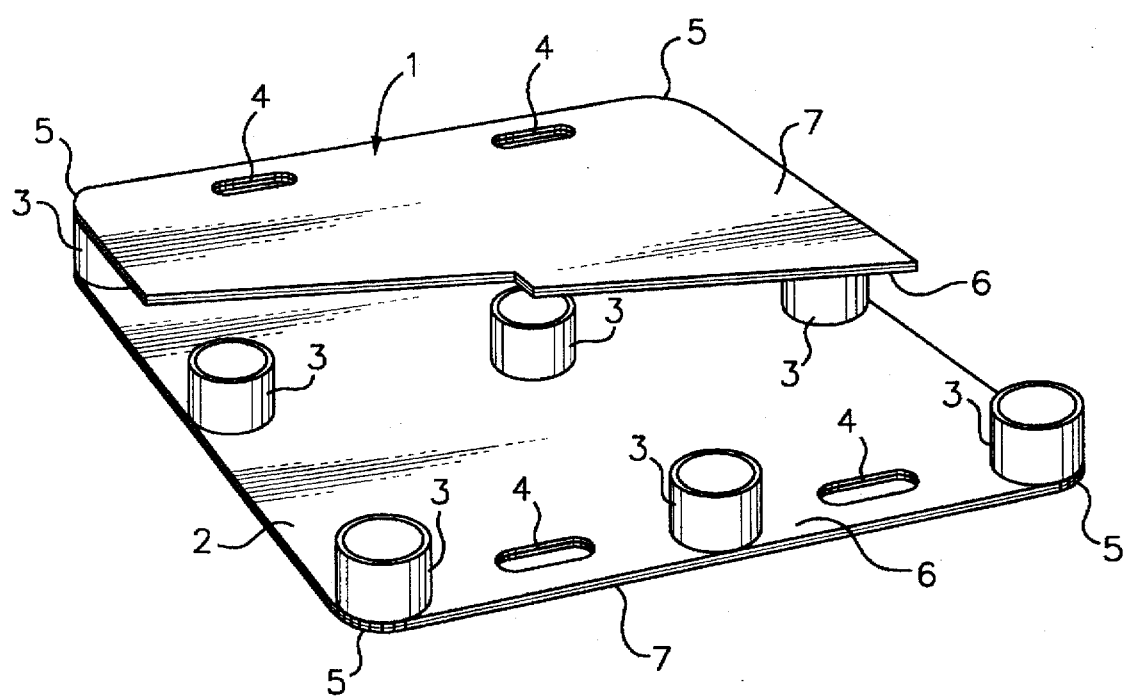
FIG. 2 is a partial cross-section of a completed model of the proposed corrugated pallet displaying the arrangement of the cores the assembled corrugated decks and the hand holds.

A partial cross-sectional view of the completed pallet is shown in FIG. 2 on drawing sheet 2. The said cross-laminated corrugated upper and lower decks are shown respectfully as 1 and 2. These each are shown to include the interior 6 and exterior 7 corrugated sheets arranged and bonded as previously described. A typical arrangement of the cylindrical dense fiber cores 3 in relation to the corrugated decks 1 and 2 is displayed in FIG. 2, as well as a common placement of the handholds 4. FIG. 2, also displays the corners of the said decks to show that they are rounded along the same curvature as the cylindrical fiber cores 3, on both the upper and lower decks.

Figure 3:
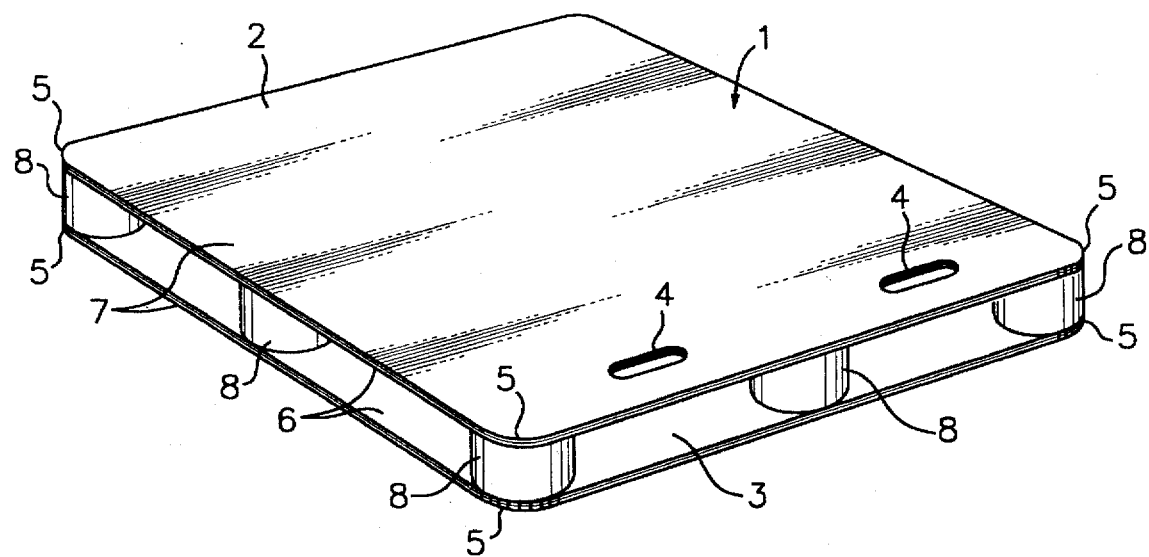
FIG. 3 is a top perspective view of a completed Recyclable Cross-Laminated Corrugated and Fiber Core Pallet.

FIG. 3 shown on drawing sheet 3 shows topical perspective view of the invention in its completed form as expressed in FIG. 3 number 1. The two said corrugated upper and lower decks are shown respectively by numbers 2 and 3, each of which contain an interior corrugated sheet 6 and an exterior corrugated sheet 7 bonded in the manner previously mentioned. Only the perimeter vertical cylindrical fiber cores 8, on two adjacent sides are visible from this perspective. Only two of the four handholds 4 presented in the previous drawings will be visible from this perspective. FIG. 3 also displays the rounded corners 5 on the upper and lower decks and how they follow the curvature of the vertical cylindrical fiber cores 8 to provide support from the cores 8 all the way to the edge of the sheet in each of the corners 5.

While a pallet was specifically described in detailed form, changes in the quantity of corrugated sheets, cores, handholds and the placement thereof will not exceed the scope of the present invention. Additional cutouts of varying size and shape in order to allow access to pallet jacks or other pallet engaging devices, and various other modifications may be made without extending beyond the scope of the invention.

We claim:

1. A completely recyclable pallet comprising:
   a generally rectangular upper deck;
   a generally rectangular lower deck parallel to said upper deck;
   a plurality of thick-walled hollow, cylindrical paperboard spacers having first ends and second ends, wherein said first ends are adhesively affixed to said upper deck and wherein said second ends are adhesively affixed to said lower deck to provide separation between said upper and lower decks;
   each of said upper and lower decks comprising first and second sheets of corrugated paperboard said sheets including a plurality of parallel corrugated flutes, wherein a surface of the first sheet is adhesively bonded to a surface of the second sheet, and wherein the corrugated flutes of said first sheet run perpendicularly to the corrugated flutes of said second sheets.

2. The pallet of claim 1, wherein said spacers include corner spacers located proximate to corners of the pallet and further include intermediate spacers located along the perimeter of the pallet.

3. The pallet of claim 2, wherein said spacers further include one or more central spacers situated more proximate to the center of the pallet than to the perimeter of the pallet.

4. The pallet of claim 3, wherein said spacers are situated so as to permit loading of the pallet by two extending arms of a forklift from any of four sides of the pallet.

5. The pallet of claim 2, wherein said upper and lower decks include rounded corner portions, and wherein said rounded corner portions generally match the curvature of said corner spacers.

6. The pallet of claim 1, further comprising an aperture in said upper deck, said aperture extending through the first and second sheets of said upper deck, said aperture located proximate to an edge of said upper deck to facilitate handling of said pallet.

7. The pallet of claim 6, further comprising a second aperture in said lower deck, said aperture extending through the first and second sheets of said lower deck, and said second aperture located proximate to an edge of said lower deck to facilitate handling of said pallet.

8. The pallet of claim 7, wherein said aperture in said upper deck is on an opposite side of the pallet from said second aperture in said lower deck.

9. A completely recyclable pallet comprising:
   an upper deck;
   a lower deck parallel to said upper deck;
   a plurality of spacers having first ends and second ends, wherein said first ends are adhesively affixed to said upper deck and wherein said second ends are adhesively affixed to said lower deck to provide separation between said upper and lower decks;
   each of said upper and lower decks comprising first and second sheets of corrugated paperboard said sheets including a plurality of parallel corrugated flutes, wherein a surface of the first sheet is adhesively bonded to a surface of the second sheet, and wherein the corrugated flutes of said first sheet run perpendicularly to the corrugated flutes of said second sheet; and
   an aperture in said upper deck, said aperture extending through the first and second sheets of said upper deck, said aperture located proximate to an edge of said upper deck to facilitate handling of said pallet.

10. The pallet of claim 9, further comprising a second aperture in said lower deck, said aperture extending through the first and second sheets of said lower deck, and said second aperture located proximate to an edge of said lower deck to facilitate handling of said pallet.

11. The pallet of claim 10, wherein said aperture in said upper deck is on an opposite side of the pallet from said second aperture in said lower deck.

12. The pallet of claim 9, wherein said spacers are thick-walled, hollow, cylindrical cores.

13. The pallet of claim 12, wherein said spacers include corner spacers located proximate to corners of the pallet and further include intermediate spacers located along the perimeter of the pallet.

14. The pallet of claim 13, wherein said spacers further include one or more central spacers situated more proximate to the center of the pallet than to the perimeter of the pallet.

15. The pallet of claim 14, wherein said spacers are located so as to permit loading of the pallet by two extending arms of a forklift from any of four sides of the pallet.

\* \* \* \* \*